United States Patent [19]

Enjo et al.

[11] Patent Number: 4,530,773

[45] Date of Patent: Jul. 23, 1985

[54] WORKING FLUIDS FOR RANKINE CYCLE

[75] Inventors: Naonori Enjo, Suita; Masahiro Noguchi, Osaka; Satoshi Ide, Settsu, all of Japan

[73] Assignee: Daikin Kogyo Co., Ltd., Osaka, Japan

[21] Appl. No.: 555,336

[22] Filed: Nov. 28, 1983

[30] Foreign Application Priority Data

Dec. 3, 1982 [JP] Japan ................................ 57-213165
Dec. 3, 1982 [JP] Japan ................................ 57-213166

[51] Int. Cl.³ .............................................. C09K 5/04
[52] U.S. Cl. ........................................ 252/67; 252/69
[58] Field of Search ............................................ 252/67

[56] References Cited

U.S. PATENT DOCUMENTS 3,838,577 10/1974 Graniaris ............................... 252/67

FOREIGN PATENT DOCUMENTS 3105372 8/1982 Fed. Rep. of Germany .

OTHER PUBLICATIONS

Singh et al., "Dynamic viscosity of ternary mixtures of dichlorodifluoromethane (R-12), chlorodifluoromethane (R-22) and dichlorotetrafluoroethane (R-114) vapors", J. Chem. Eng. Data, 1980, 25(1), 57-59. (CA 92:47315).

Primary Examiner—Paul Lieberman
Assistant Examiner—Robert A. Wax
Attorney, Agent, or Firm—Larson and Taylor

[57] ABSTRACT

Working fluids for the Rankine cycle comprising dichlorotetrafluoroethane and a member selected from the group consisting of difluoroethane and dichlorofluoromethane.

1 Claim, 5 Drawing Figures

WORKING FLUIDS FOR RANKINE CYCLE

This invention relates to novel working fluids for a Rankine cycle.

Heretofore water has been almost exclusively used as a working fluid in the Rankine cycle in which thermal energy is converted into mechanical energy by repeating a cycle comprising vaporizing a liquid medium with heating, expanding the vapor in an expansion device to produce mechanical energy, and then cooling it to condense and compressing by a pump. Although long applied as a working fluid to steam engines, water has the following drawbacks. It has a limited application due to its high freezing point and great specific volume on vaporization; requires a larger installation and is lower in efficiency when using a low-temperature heating source; and readily freezes and is not workable at low temperatures.

While various organic working fluids have been proposed instead of water to eliminate the above drawbacks. Most of them are found to be unsatisfactorily usable due to their inflammability, corrosivity, and so on. Among these fluids trichlorofluoromethane (hereinafter to be referred to as Flon-11) is used in practice. However, Flon-11 has the following drawbacks as the working fluids for the Rankine cycle. It has low efficiency in conversion of thermal energy into mechanical energy, having further reduced efficiency particularly at a higher heating temperature range where it is decomposed to change its thermodynamic properties. When thermally decomposed, Flon-11 produces free chlorine to cause corrosion to the apparatus. Because of the above-mentioned drawbacks, Flon-11 is not suited as a working fluid which is usable for any kind of heat sources. Thus, there is an intensive demand to the development of working fluids usable for the Rankine cycle with an improved conversion efficiency and thermal stability.

To meet such demand for satisfactory working fluids, we conducted extensive research and found that a mixture of certain substances having different properties exhibits a superior properties to those of working fluids comprising a single substance which have heretofore been studied and that, particularly, a mixture of dichlorotetrafluoroethane (hereinafter referred to as Flon-114) with a member selected from the group consisting of difluoroethane (hereinafter referred to as Flon-152), and dichlorodifluoromethane (hereinafter referred to as Flon-12) gives markedly excellent properties as a working fluid for the Rankine cycle.

It is an object of this invention to provide working fluids for a Rankine cycle which fluids can exceedingly increase the efficiency of conversion of thermal energy to mechanical energy.

It is another object of this invention to provide working fluids for a Rankine cycle which fluids have a markedly high stability at a high-temperature range and can be used with safety.

These objects and other characteristics of this invention will become apparent from the following description.

The foregoing objects can be achieved by using a working fluid which comprises Flon-114 and a member selected from the group consisting of Flon-152 and Flon-12.

The working fluids of this invention can be easily prepared by mixing the above specified components in an appropriate ratio.

The working fluids of the invention comprising a mixture of Flon-114 with one of Flon-152 and Flon-12 have the following advantages over heretofore known working fluids.

The working fluids of the present invention produces a markedly higher efficiency in conversion of thermal energy into mechanical energy than those produced by a heretofore known working fluid such as Flon-11 or Flon-114 alone.

Further, while an inflammable or explosive medium have a limited application for use as a working fluid, the working fluids of the invention is neither inflammable nor explosive. Flon-152, which is inflammable by itself, can be made less inflammable when mixed with Flon-114, and becomes substantially noncombustible in the range of content of less than 40% of Flon-152.

The mixture of Flon-114 with Flon-12 is usable in a wide range of composition. Generally, the mixture is used at the content of 90–10 weight % of Flon-114 and 10–90 weight % of Flon-12.

According to the present invention, particularly significant improvement of the efficiency in power output can be obtained with use of a working fluid comprising about 90 to about 60% by weight of Flon-11 and about 10 to about 40% by weight of Flon-152 or a working fluid comprising about 90 to about 10% by weight of Flon-114 and about 10 to about 90% by weight of Flon-12.

Referring to the accompanied drawings.

Figure 1:
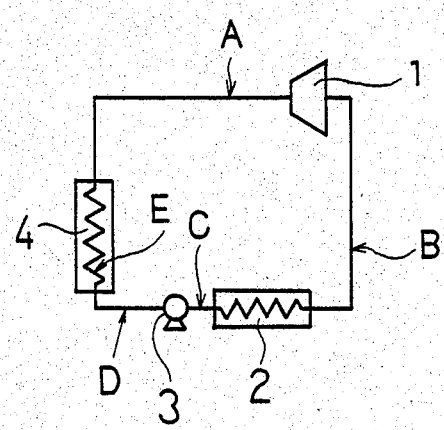
FIG. 1 is a flow sheet of the Rankine cycle carried out for conversion of thermal energy into mechanical energy.
Figure 3:
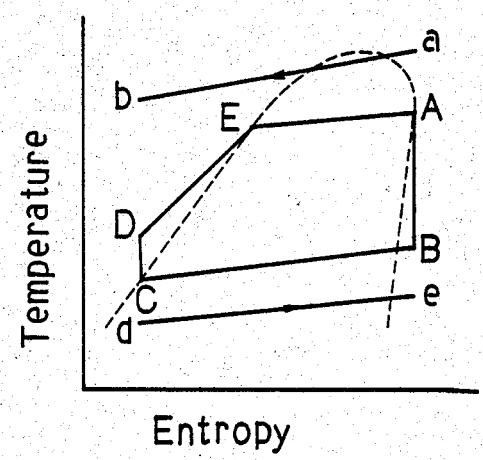
FIG. 3 shows a temperature-entropy diagram of the Rankine cycle in which a mixture of Flon-114 and Flon-152 is used as a working fluid. The alphabets (A to E) appearing in FIG. 3 correspond respectively to those in FIG. 1 and represent points of state of the working fluid.
Figure 5:
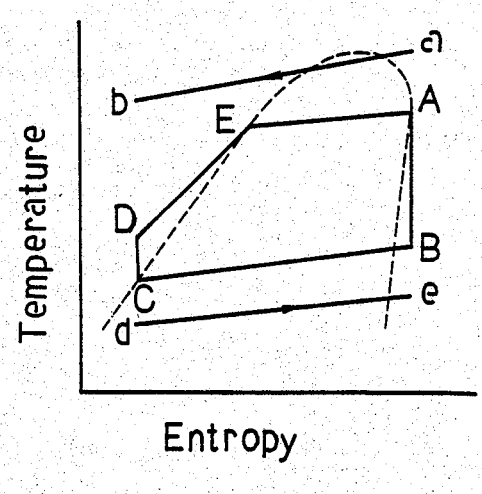
FIG. 5 shows a temperature-entropy diagram of the Rankine cycle in which a mixture of Flon-114 and Flon-12 is used as a working fluid. The alphabets (A to E) appearing in FIG. 5 correspond to respectively to those in FIG. 1 and represent points of state of the working fluid.
Figure 2:
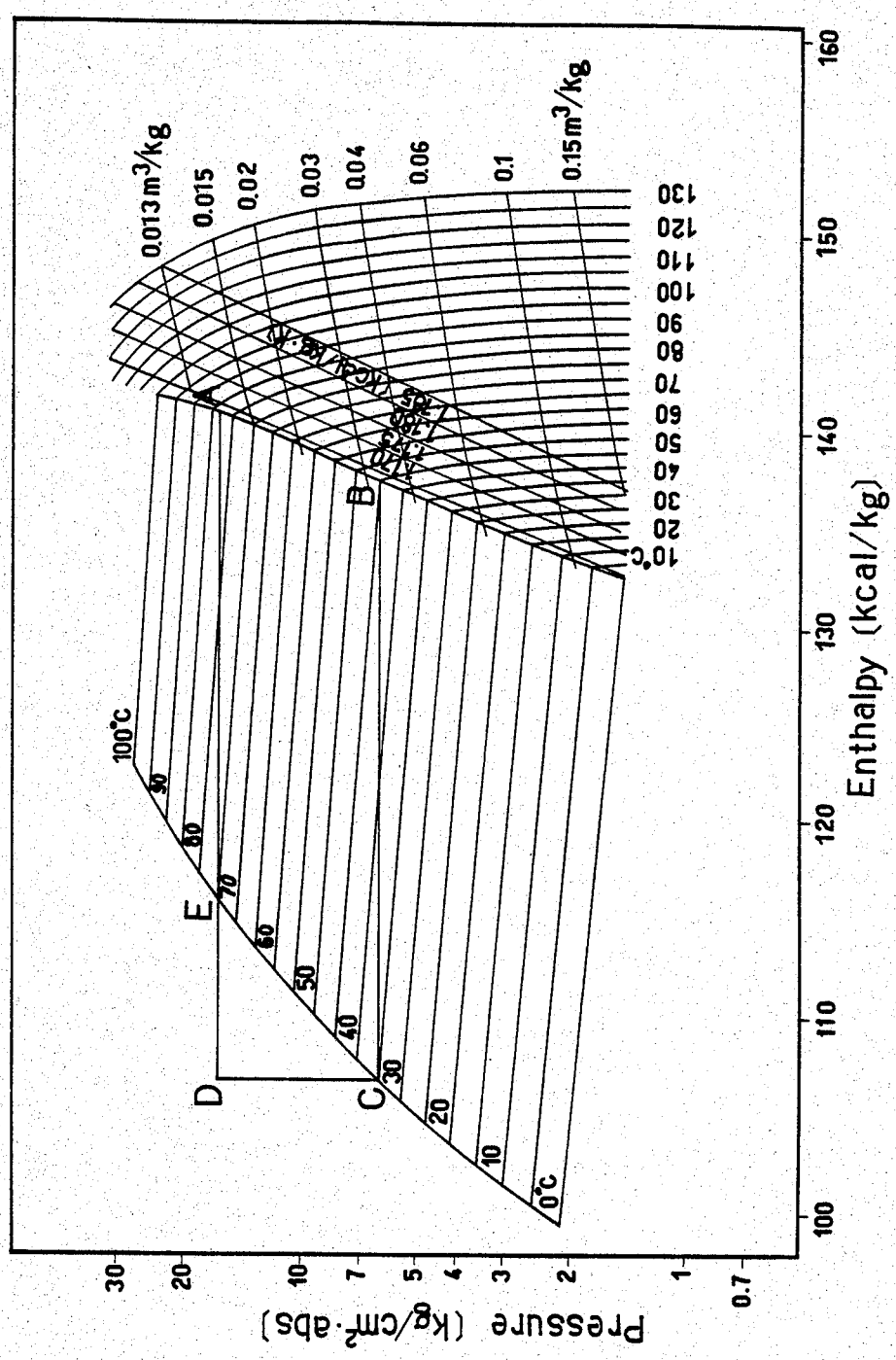
FIG. 2 is a pressure-enthalpy diagram (P-H diagram) of a mixture according to the invention which comprises 70% by weight of Flon-114 and 30% by weight of Flon-152. The points A, B, C, D and E appearing in FIG. 2 correspond to those in FIG. 1 and following FIG. 3 which represent the respective points of state in the Rankine cycle carried out in Examples 1 to 4 below.
Figure 4:
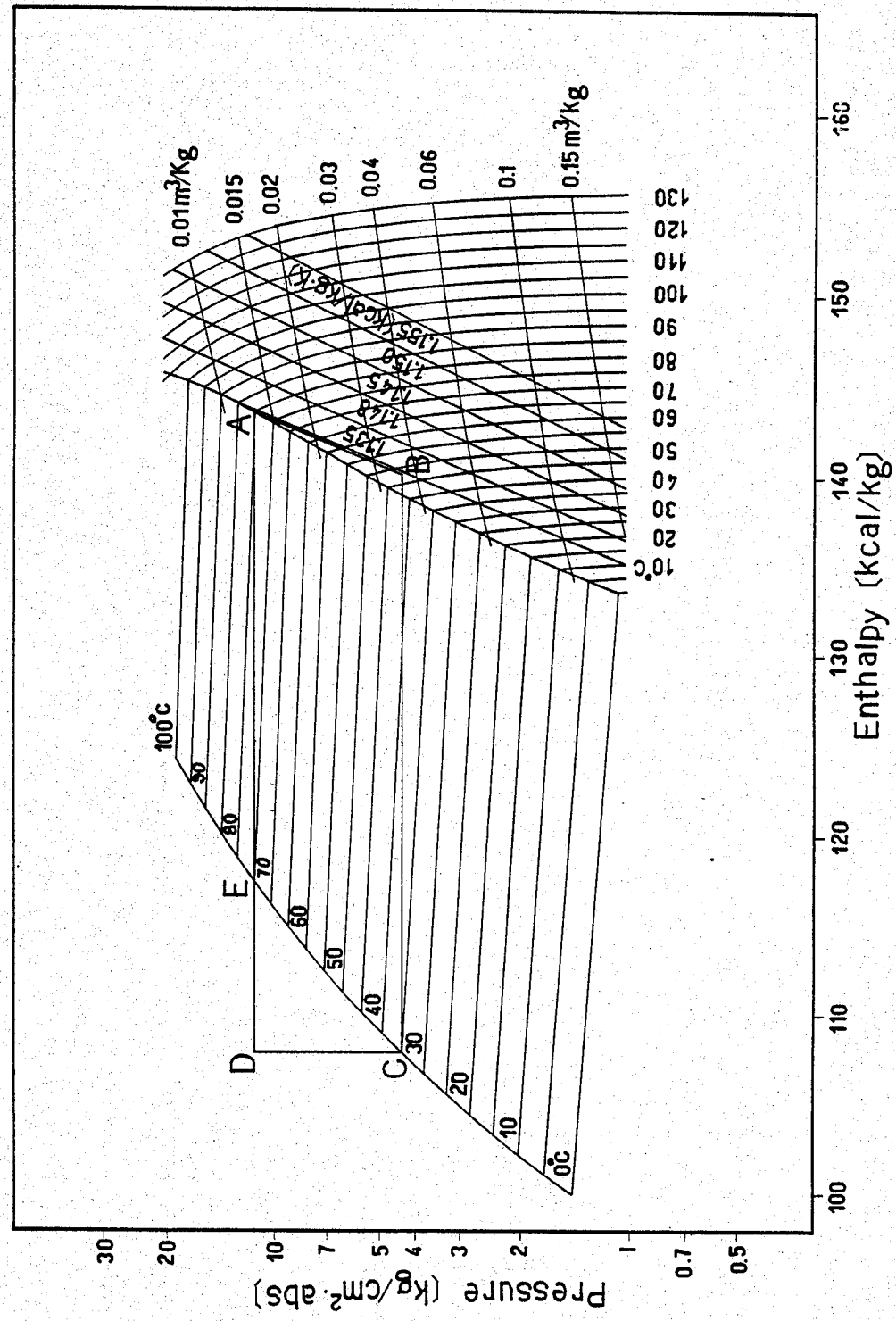
FIG. 4 is a pressure-enthalpy diagram (P-H diagram) of a mixture according to the invention comprising 80% by weight of Flon-114 and 20% by weight of Flon-12. The points A, B, C, D and E appearing in FIG. 4 correspond to those in FIG. 1 and following FIG. 5 which represent the respective points of state in the Rankine cycle carried out in Examples 5 to 8 below.

Referring to the Figures, a working fluid is heated and vaporized in the evaporator 4 to produce vapor of high temperature and high pressure. The change of state is shown by D, E and A in FIGS. 3 and 5 where the liquid-phase working fluid is heated to a boiling temperature at which the total fluid vaporizes. The vapor is then superheated (as shown by the change from E to A), and enters the expansion device 1 in which the superheated vapor is adiabatically expanded. At the time, the temperature and pressure are lowered and the state of the fluid is changed from A to B as shown in FIGS. 3 and 5 for the fluid to conduct the work. The vapor-phase working fluid at lowered temperature and pressure is then sent to the condenser 2 where it is cooled by a low-temperature heat source to condense and get into a liquid phase (as indicated by the change from B to C in FIGS. 3 and 5). Thereafter the fluid is returned to the pump 3 to repeat the cycle. In FIGS. 3 and 5 the point a represents the state of a heat source, e.g. warm water, when it enters the evaporator, b represents the state of the heat source when it leaves the evaporator and the arrow on the line from a to b indicates the direction of flow of the heat source. The point d represents the state of cold water at the inlet of condenser, the points e represents the state of the same at the outlet of the condenser and the arrow on the line from d to e indicates the direction of flow of the cold water.

Usable as the expansion device for a Rankine cycle system are for example rotating or reciprocating displacement expansion devices and turbine expansion devices. Boilers commonly used to produce steam are usable as the evaporator for the system. Illustrative of usable condensers are those of the type as used in refrigerating apparatus. Employable as the pump are pressure liquid feed pumps for organic solvents generally used in chemical industries.

The invention will be described below in more detail with reference to examples and comparison examples wherein the ratio of the constituents will be indicated in % by weight unless otherwise specified.

EXAMPLES 1-8 AND COMPARISON EXAMPLE

The Rankine cycle illustrated in FIGS. 1 to 3 or 1, 4 and 5 was carried out with use of the respective working fluids having compositions given in Table 1 below in the same apparatus under the following conditions:
(i) temperature of hot water at point a in FIGS. 3 or 5 ... 110° C. or 140° C.
(ii) temperature of cold water at point d in FIGS. 3 or 5 ... 25° C. or 32° C.

The output characteristics were determined in the electric power generation obtained from conversion of thermal energy to mechanical energy at a charging rate of 1,500 t/h of hot water. The results are given in Table 2. The evaporation temperature was set at a temperature at which the highest output was produced and the condensing temperature was 35° C.

TABLE 1

| Medium | Comp. Example | Example 1 | 2 | 3 | 4 | 5 | 6 | 7 | 8 |
|---|---|---|---|---|---|---|---|---|---|
| Flon-114 | 100 | 90 | 80 | 70 | 60 | 80 | 60 | 40 | 20 |
| Flon-152 |  | 10 | 20 | 30 | 40 |  |  |  |  |
| Flon-12 |  |  |  |  |  | 20 | 40 | 60 | 80 |

TABLE 2

| Power output characteristics | Comp. Example | Example 1 | 2 | 3 | 4 | 5 | 6 | 7 | 8 |
|---|---|---|---|---|---|---|---|---|---|
| Temperature of hot water: 110° C. | | | | | | | | | |
| Adiabatic enthalpy drop (AE) (Kcal/kg) | 2.1 | 2.7 | 3.0 | 3.3 | 3.6 | 2.5 | 2.6 | 2.5 | 2.4 |
| Flow rate of working fluid (GF) (ton/hr) | 1500 | 1300 | 1190 | 1100 | 1030 | 1420 | 1390 | 1400 | 1440 |
| Gross power output (POW) (KW) | 3380 | 3710 | 3950 | 4020 | 4060 | 3940 | 3910 | 3880 | 3850 |
| Pump power for working fluid (PIA) (KW) | 330 | 380 | 400 | 430 | 450 | 390 | 440 | 500 | 560 |
| Pump power for cold & warm water (PIB) (KW) | 680 | 680 | 650 | 630 | 620 | 690 | 680 | 680 | 700 |
| Net power output (PWT) (KW) | 1930 | 2220 | 2470 | 2550 | 2580 | 2420 | 2360 | 2250 | 2150 |
| Temperature of hot water: 140° C. | | | | | | | | | |
| Adiabatic enthalpy drop (AE) (Kcal/kg) | 3.0 | 3.7 | 4.1 | 4.4 | 4.7 | 3.4 | 3.5 | 3.4 | 3.3 |
| Flow rate of working fluid (GF) (ton/hr) | 2640 | 2310 | 2120 | 1980 | 1880 | 2530 | 2520 | 2530 | 2760 |
| Gross power output (POW) (KW) | 8810 | 9390 | 9610 | 9760 | 9790 | 9660 | 9740 | 9800 | 10020 |
| Pump power for working fluid (PIA) (KW) | 770 | 900 | 990 | 1080 | 1160 | 930 | 1080 | 1250 | 1500 |
| Pump power for cold & warm water (PIB) (KW) | 1230 | 1210 | 1160 | 1130 | 1120 | 1250 | 1240 | 1250 | 1310 |
| Net power output (PWT) (KW) | 6150 | 6620 | 6830 | 6940 | 6890 | 6830 | 6750 | 6620 | 6520 |

The results, as shown in Table 2, reveal that the working fluids comprising Flon-114 and one of Flon-152 and Flon-12 permit to exhibit electric power output characteristics which are significantly superior to that obtainable with use of working fluid comprising Flon-114 alone. The results further reveal that the working fluids permit to produce markedly increased electric power output in the range of content of higher than 10% by weight of Flon-152 or 10 to 40% by weight of Flon-12. The results also reveal that the working fluids comprising Flon-114 and Flon-152 or Flon-12 afford improvement of efficiency of the cycle because of its small superheating degree of steam at the outlet of turbine.

In a glass tube were sealed a working fluid comprising Flon-114 or a mixture of Flon-114/Flon-152 (weight ratio 70/30) or Flon-114/Flon-12 (80/20) together with iron piece and lubricating oil. The sealed tube was heated at 150° C. for 100 hours and then the resulting working fluids were determined for concentration of halogen and amount of decomposition material by gas chromatography. The results are given in Table 3 below.

TABLE 3

| Working fluid | Conc. of halogen after heating (ppm) | Amount of decomposition material (%) | Remark |
|---|---|---|---|
| Flon-114 + Flon-152 | 32 | 0.1 | This invention |
| Flon-114 + Flon-12 | 40 | 0.2 | This invention |
| Flon-114 | 44 | 0.2 | Control |
| Flon-11 | 180 | 0.7 | " |

The results shown in Table 3 reveal that the working fluid of the invention comprising a mixture of Flon-114 and Flon-152 or Flon-12 forms a reduced amount of halogen ion and reduced amount of decomposition material determined by gas chromatography in contrast with the control working fluid comprising Flon-11 or Flon-114 alone. With the mixed working fluid of Flon-114 and Flon-152 or Flon-12, it is derived that the reduced concentration of halogen formed at a high temperature reduces the corrosion of metal materials of the apparatus due to the working fluid and the reduced amount of decomposed material results in inhibition of change of thermodynamic properties as a working fluid for the Rankine cycle due to the decomposition material and in inhibition of reduction of the cycle efficiency.

Consequently, the working fluids of the invention comprising a mixture of Flon-114 and Flon-152 or Flon-12 is markedly superior to the heretofore known working fluids, such as Flon-11 in the energy-conversion efficiency, heat exchanging characteristics, thermal stability, and the like.

We claim:

1. Working fluids for the Rankine cycle comprising 90 to 10% by weight dichlorotetrafluoroethane and about 10 to about 40% by weight difluoroethane.

* * * * *

UNITED STATES PATENT AND TRADEMARK OFFICE
CERTIFICATE OF CORRECTION

PATENT NO. : 4,530,773
DATED : July 23, 1985
INVENTOR(S) : ENJO et al

It is certified that error appears in the above-identified patent and that said Letters Patent is hereby corrected as shown below:

Column 6, next to the last line, change "90 to 10%" to --90 to 60%--

Signed and Sealed this

Fifth Day of April, 1988

*Attest:*

DONALD J. QUIGG

*Attesting Officer*    *Commissioner of Patents and Trademarks*